United States Patent [19]
Leisinger et al.

[11] Patent Number: 4,977,969
[45] Date of Patent: Dec. 18, 1990

[54] WEIGHING APPARATUS WITH CALIBRATION WEIGHT MEANS

[75] Inventors: Roger Leisinger, Zürich; Erwin Meixner, Volkertswil, both of Switzerland

[73] Assignee: Mettler Instrumente AG, Greifengee, Switzerland

[21] Appl. No.: 420,118

[22] Filed: Oct. 11, 1989

[30] Foreign Application Priority Data

Nov. 8, 1988 [CH] Switzerland .................. 4147/88

[51] Int. Cl.⁵ .................. G01G 19/52; G01L 25/00
[52] U.S. Cl. .................. 177/50; 73/1 B
[58] Field of Search .................. 177/50; 73/1 B

[56] References Cited

U.S. PATENT DOCUMENTS

| | | | |
|---|---|---|---|
| 3,698,233 | 10/1972 | Braden et al. | 73/1 B |
| 3,738,439 | 6/1973 | Herbert | 177/50 |
| 4,184,557 | 1/1980 | Kunz . | |
| 4,311,202 | 1/1982 | Kunz . | |
| 4,337,838 | 6/1982 | Kunz . | |
| 4,425,975 | 1/1984 | Luchinger | 177/50 |
| 4,429,757 | 2/1984 | Kunz . | |
| 4,545,448 | 10/1985 | Kunz . | |
| 4,611,676 | 9/1986 | Meiring | 177/50 |
| 4,627,505 | 12/1986 | Kunz . | |
| 4,766,965 | 8/1988 | Luchinger | 177/50 |

FOREIGN PATENT DOCUMENTS 93183 10/1986 European Pat. Off. .
8438006.3 3/1986 Fed. Rep. of Germany .

*Primary Examiner*—George H. Miller, Jr.
*Attorney, Agent, or Firm*—Laubscher, Presta & Laubscher

[57] ABSTRACT

An electronic weighing apparatus is provided, including a self-contained calibration weight module that is operated by a motor to alternately connect and disconnect, respectively, a calibration weight relative to the vertically-displaceable parallelogram-guided load receiving member of the scale. The calibration weight is normally suspended in an inoperable condition by means of a pair of internally threaded sleeves rotatably supported in the cover portion of the housing of the calibration weight module. A motor is operable to rotate the sleeves and thereby lower lifting screws threadably connected therewith, whereby the calibration weight is lowered toward a supported position between and in engagement with a pair of parallel carrier arms that extend horizontally from the load receiver.

11 Claims, 3 Drawing Sheets

WEIGHING APPARATUS WITH CALIBRATION WEIGHT MEANS

STATEMENT OF THE INVENTION

The present invention relates to an electronic weighing apparatus including a calibration weight module that is operable to connect and disconnect a calibration weight from the load receiving member of the weighing apparatus, characterized by the provision of motor-driven screw-threaded means for raising and lowering the calibration weight relative to carrier means that extend horizontally from the load receiver.

BRIEF DESCRIPTION OF THE PRIOR ART

In highly accurate and sensitive weighing apparatus, it is customary from time to time to make a comparison between a reference or calibration weight and the weight calculated from the measurement signal. In this regard, a reference or calibration weight is placed on the weighing pan for making the appropriate weight comparisons.

From German Utility Model No. G 8438006.3, a mechanism is known for the placement of a calibration weight where the latter, by means of a vertically movable prong, whose end engages a borehole of the calibration weight from underneath, is pressed upwardly toward fixed stops during the weighing operation, the weight being subsequently deposited for calibration purposes on three centering pins located on the load arm. The prong is moved axially by an eccentric drive and is axially guided underneath one spar of the load arm, leaving a swing sector free for the load arm.

The known mechanism possesses the inherent drawback that, during the weighing operation, the calibration weight must be pressed by the prong against an overhead housing and that, between the eccentric drive that lifts the prong and the placement surface for the calibration weight, a moment is generated that adversely affects the scale. Moreover, this arrangement can only be built into scales that contain a calibration weight receiver specially provided for this purpose and that allow sufficient room for the installation of the superposed drive motor elements as well as the lifting and calibration elements.

In European Pat. No. 0,093,183, another mechanism for the placement of a calibration weight is disclosed. The calibration weight—a cylinder or a sphere—rests on a fork-shaped carrier that can be shifted vertically by means of a threaded screw or spindle. The calibration weight—which rests freely on the carrier—can, during weighing, be pressed against a stop so that a turning moment, acting upon the scale body, is again generated between the carrier and the stop.

The purpose of the present invention is to provide a lifting device for a calibration weight where the calibration weight during weighing and during transportation is securely held on the housing of the scale without the generation of any forces upon the housing.

SUMMARY OF THE INVENTION

Accordingly, a primary object of the present invention is to provide a weighing apparatus including a self-contained calibration weight module having a housing with a cover portion from which the calibration weight is suspended via motor-driven screw thread means that are operable to alternatively raise and lower the calibration weight relative to carrier arm means that extend horizontally from the load receiver.

By combining the screw-thread means and the stop against which the calibration weight is pressed in a self-contained calibration weight module, the forces resulting from calibration weight operation are isolated from the main housing of the weighing apparatus, and the structural height of the weight lifting means and the calibration weight may be kept extremely low. According to another advantage, it is also possible to use the same lifting means for calibration weights of various sizes. The entire lifting device can be placed in a separate housing of its own which can be inserted into the scale as a self-contained unit. Another advantage of the invention resides in the fact that the calibration weight is suspended at a minimum of two places so that, in case of sudden impact during transportation, the resultant forces will not be transmitted to the scale housing while being concentrated in a single spot. As a result of the omission of the lever mechanisms of the prior art, the calibration weight is connected completely rigidly with the scale while in the rest position.

According to a more specific object of the invention, the calibration weight is supported for vertical movement within a calibration weight housing by a pair of screws that extend upwardly from the weight into threaded engagement with internally-threaded sleeves, respectively, that are rotatably supported in openings contained in the cover portion of the calibration weight housing. Driven pinions are connected with the sleeve members and are driven from a drive motor via a bevel gear arrangement, a driving pinion, and an intermediate pinion.

BRIEF DESCRIPTION OF THE DRAWINGS

Other objects and advantages of the invention will become apparent when viewed in the light of the accompanying drawings, in which.

DETAILED DESCRIPTION

Figure 1:
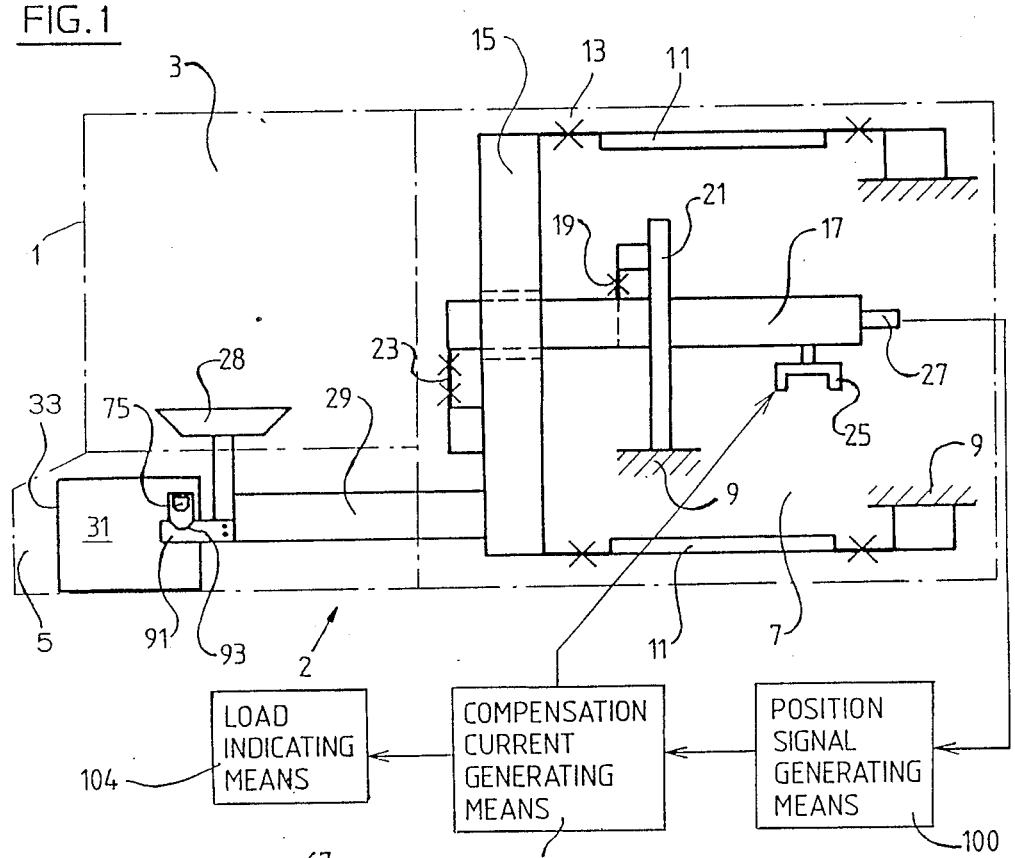
FIG. 1 is a diagrammatic representation of an electronic weighing apparatus incorporating the calibration weight arrangement of the present invention.
Figure 2:
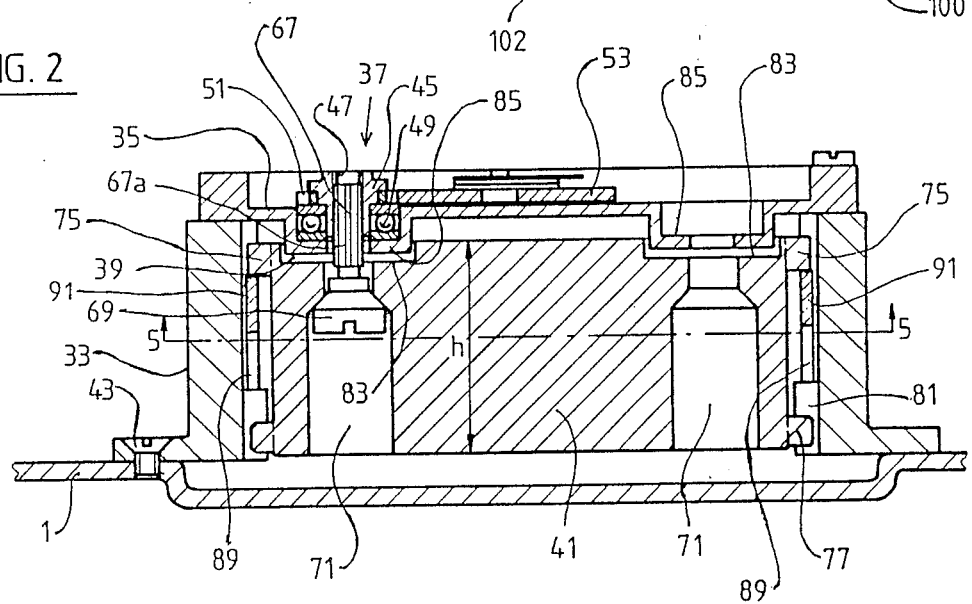
FIG. 2 is a sectional view of the calibration weight module of FIG. 1 taken along line 2—2 of FIG. 3, certain parts having been omitted for clarity.

Referring first more particularly to FIGS. 1 and 2, the weighing apparatus 2 includes a stationary frame 9 that is enclosed within the scale housing 1, which apparatus includes the customary load-receiving member 15 that is guided for vertical movement relative to the stationary frame 9 by a conventional parallelogram linkage arrangement including the horizontal guide members 11 and flexible bearings 13. Examples of such guide means are presented by the prior Kunz U.S. Pat. Nos. 4,184,557, 4,311,202, 4,337,838, 4,429,757, 4,545,448 and 4,627,505. The housing 1 includes a weighing compartment 3, an operating keyboard 5 and a compartment 7 for receiving the mechanical weighing components and the electrical circuitry.

Suspended from the vertical fixed support arm 21 by a flexible bearing 19 is the balance lever 17, one end of which is connected with the load receiver 15 by flexible bearing means 23. At the other end, the lever 17 is provided with an electromagnetic load compensation coil 25 that, as is conventional in the art, is mounted within the permanent magnetic field established by permanent magnet means (not shown) connected with the stationary frame 9. Lug 27 extends within optical position sensing means that transmit a signal to position signal generating means 100, which operates the current generator 102 to supply electromagnetic load compensation current to the coil 25, thereby to maintain the lever 17 in its initial null position, the magnitude of the compensating current being a function of the load applied to the weighing pan as indicated by load indicating means 104. The weighing pan 28 is connected with the vertical displaceable load receiving means 15 by horizontal arm means 29.

Connected with the scale housing 1 adjacent the weighing pan 28 is a calibration weight module 31 which is shown in greater detail in FIG. 2. The calibration weight module 31 includes a housing 33 that is secured to the base of the main housing 1 by screws 43, the calibration weight module including a cover portion 35 that extends across and closes the upper end of a chamber contained within the calibration weight module. The cover portion 35 serves both as a support for the lifting means for raising and lowering the calibration weight 41 and also is a stop for limiting the upper extent of travel of the calibration weight 41. Other than the connection of the calibration weight module to the base plate of the housing 1 by screws 43, there is no permanent connection to any mechanical part of the weighing apparatus 2.

Figure 3:
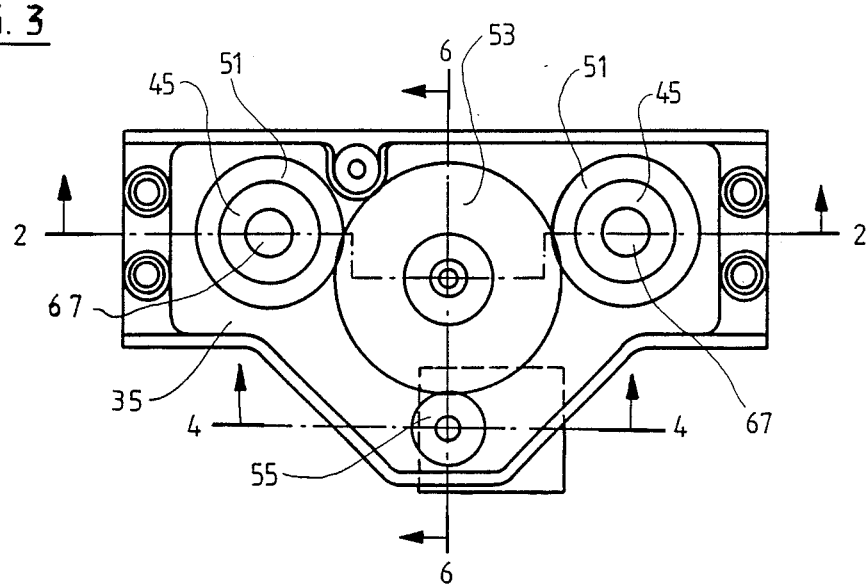
FIG. 3 is a top plan view of the calibration weight module of FIG. 2.
Figure 4:
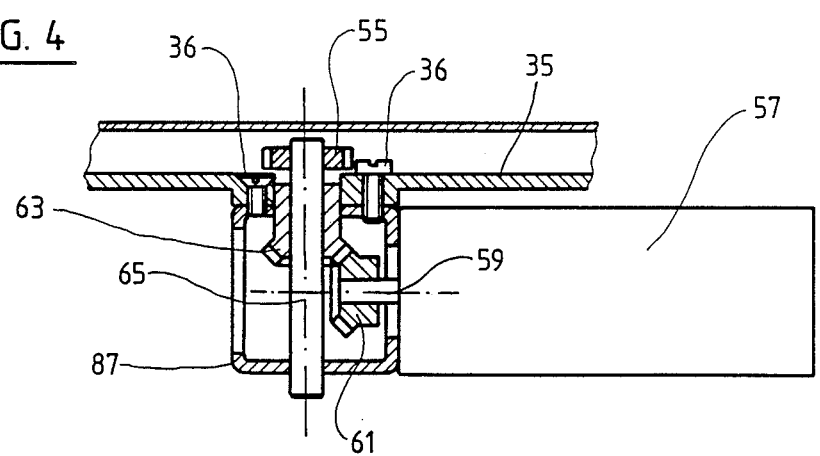
FIG. 4 is a sectional view taken along line 4—4 of FIG. 3.
Figure 5:
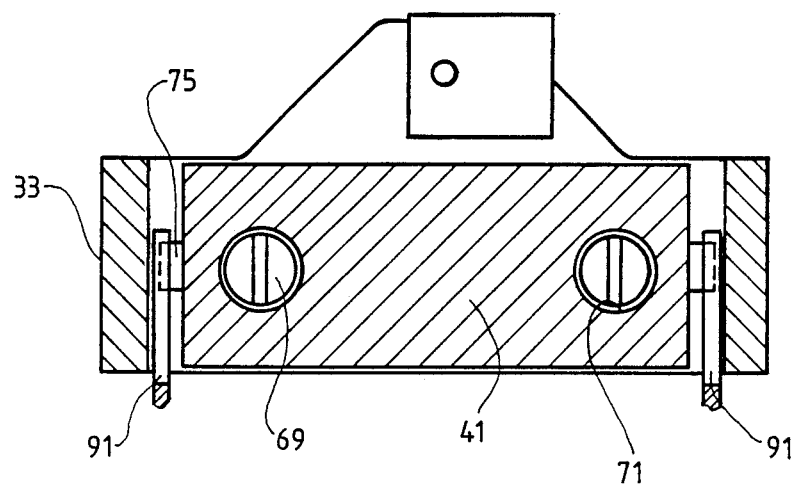
FIG. 5 is a sectional view taken along line 5—5 of FIG. 2.
Figure 6:
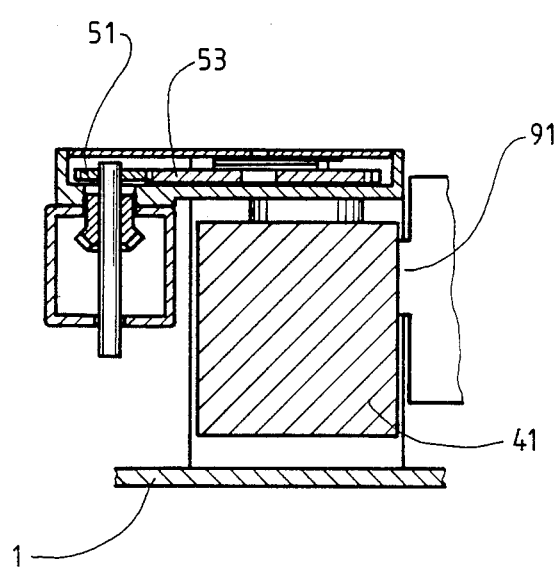
FIG. 6 is a sectional view taken along line 6—6 of FIG. 3.

Rotatably mounted in openings contained in the upper cover portion 35 of the calibration weight module 31 are a pair of internally-threaded sleeves 45 that are rotatably supported by bearing means 49 contained within a pocket 85 formed in the cover portion. Connected with the sleeves 45 are pinion gears 51, as shown in FIG. 3. The pinion gears 51 are driven from an electrical drive motor 57 (FIG. 4) via a pair of bevel gears 61, 63, a driving pinion 55, and an intermediate gear 53, as shown in FIG. 3. Although the drive motor 57 could be directly connected with the driving pinion 55, by use of the bevel gear arrangement 61, 63, the height of the calibration weight module 31 is kept relatively low.

Referring again to FIG. 2, each sleeve member 45 is threadably connected with the upper threaded shank portion 67 of a lifting screw having at its lower end an enlarged head portion 69. The enlarged head portion 69 is contained in the enlarged portion of a counterbore 71 that extends upwardly through the calibration weight 41. In order to prevent rotation of the lifting screw 67 relative to the cover portion 35 of the calibration weight housing, the shank portion of the lifting screw is provided with a vertical slot 67a that receives a corresponding key (not shown) on the pocket portion 85 of the cover 35. As shown in FIG. 2, the upper portion of the enlarged head portion 69 and the corresponding wall surface of the counterbore 71 are of conical configuration.

In accordance with an important feature of the invention, the calibration weight 41 is provided adjacent its upper end with a pair of opposed outwardly-projecting lateral projections 75, and adjacent its lower end, the calibration weight is provided with a pair of laterally outwardly projecting lugs 77 that extend within corresponding guide channels 81 contained in the inner wall surface of calibration weight housing 33. The upper end surface of the calibration weight contains a pair of recesses 83 that are adapted to receive the pockets 85 formed in the upper cover member 35 when the calibration weight 41 is elevated to its uppermost disconnected position. The height h of the calibration weight 41 is a measure of its weight.

As indicated previously, the drive motor 57 is connected with a housing 87 having a generally rectangular cross sectional configuration, which housing 87 is secured to the cover member 35 by screw means 36. Consequently, the output bevel gear 61 from the drive motor is connected within the housing 87.

The calibration weight housing 35 contains a pair of openings 89 that receive carrier arm extensions 91 that extend horizontally from the weighing pan arms 29, respectively, beneath the lateral projections 75 on the calibration weight 41. Thus, when the calibration weight 41 is lowered to its operable position illustrated in FIG. 2, the projections 75 rest upon recesses 93 (FIG. 1) contained in the upper surface of the carrier arms 91, respectively, so that upon further lowering of the lifting screws 69 within the counterbores 71, the weight 41 is supported solely by the carrier arms 91. Thus, in order to lower the calibration weight from its uppermost position relative to cover member 35, motor 57 is operated to drive the pinions 51 via bevel gear 61, 63, drive pinion 55, and intermediate pinion 53, so that the internally-threaded sleeves 45 are rotated to lower the associated lifting screws 67, thereby to cause the headed portion 69 thereof to be lowered beyond the corresponding conical surfaces of the associated counterbore 71, respectively. The lateral projections 75 are then supported in grooves 93 on the upper surfaces of the carrier arms 91, as described above. The calibration weight thus is applied to the load carrier member 15 via the carrier arms 91 and the connecting arm 29, whereupon the weighing apparatus may be calibrated as is customary in the art. Following the calibration operation, motor 57 is driven in the opposite direction to rotate pinions 51 in the opposite direction, whereupon the sleeves 45 are rotated in a direction to cause lifting screws 67 to be driven upwardly, thereby causing the enlarged head portion 69 to engage the upper surfaces of the counterbores 71 to cause weight 41 to move upwardly against the stops defined by the lower surfaces of the pockets 85 formed in the cover member 35. The downward movement of calibration weight 41 can be accomplished by means of an electronic revolution counter on motor 57 or on sleeve 45. Furthermore, it is possible to provide a mechanical scanning of the rotation angle of gear 53 for determining the upper and lower terminal positions of enlarged screw head 69 which carries the calibration weight 41.

Thus, the forces that are generated during the retention of calibration weight 41 in the retracted position by lifting screws 67 and bearings 49 act only within the cover member 35 of the calibration weight module, whereby the transmission of any bending forces or moments upon the scale housing 1 or other parts of the weighing apparatus 2 is completely avoided.

While in accordance with the provisions of Patent Statutes the preferred form and embodiment of the invention has been illustrated and described, it will be apparent that changes can be made without deviating from the inventive concepts set forth above.

What is claimed is:

1. Electronic weighing apparatus comprising:
 (a) a frame (9);
 (b) load receiving means (15) connected for vertical movement relative to said frame;
 (c) a calibration weight (41);
 (d) means for connecting and disconnecting said calibration weight relative to said load receiving means, respectively, said connecting and disconnecting means including:
   (1) a calibration weight housing (33) connected with said frame adjacent said load receiving means, said housing containing a chamber in which said calibration weight is arranged, said housing including a cover portion (35) defining the upper wall of said chamber and containing therein at least one vertical through passage;
   (2) an internally-threaded vertical sleeve (45) rotatably mounted in said through passage;
   (3) lifting screw means (67) threadably connected at its upper end with said sleeve and connected at its lower end with said calibration weight; and
   (4) drive means including a motor (57) for alternately rotating said sleeve to raise and lower said lifting screw and said calibration weight relative to said load receiving means, respectively.

2. Apparatus as defined in claim 1, wherein said calibration weight contains a vertical bore (71) in alignment with said through passage, the lower end portion of said bore being enlarged, said lifting screw means including a lifting screw having an upper threaded shank portion, the lower end of said lifting screw extending within said bore and terminating in an enlarged head portion (69) arranged within said enlarged bore portion.

3. Apparatus as defined in claim 1, and further including means (67a) preventing rotation of said lifting screw relative to said calibration weight housing.

4. Apparatus as defined in claim 1, wherein said drive means includes a driven pinion gear (51) mounted concentrically on said sleeve, and a driving pinion (55) connected with said motor.

5. Apparatus as defined in claim 4, wherein at least two of said sleeves are provided each having a lifting screw and driven pinion associated therewith, respectively, and further including an intermediate gear (53) connected between said driving and driven gears, and bevel gear means (61, 63) connecting said drive motor with said driving pinion.

6. Apparatus as defined in claim 5, and further including a bevel gear housing (87) in which said bevel gear means are mounted, and means connecting said drive motor with said bevel gear housing.

7. Apparatus as defined in claim 6, and further including means connecting said bevel gear housing with said calibration weight housing cover portion.

8. Apparatus as defined in claim 1, wherein said weighing apparatus includes a housing (1) in which said calibration weight housing is mounted.

9. Apparatus as defined in claim 8, wherein said motor (57) is connected with said calibration weight housing.

10. Apparatus as defined in claim 1 wherein said load receiving means includes a pair of parallel horizontal carrier arm means (91) that extend on opposite sides of said calibration weight beneath outwardly extending lateral projections (75) thereon, respectively.

11. Apparatus as defined in claim 10, wherein said calibration weight housing contains a pair of vertical slots that receive said carrier arm means, respectively.

* * * * *